United States Patent
Jost et al.

(10) Patent No.: US 12,204,831 B2
(45) Date of Patent: Jan. 21, 2025

(54) GRIPPING TOOLS FOR A LASER CUTTING MACHINE FOR SORTING PARTS

(71) Applicant: BYSTRONIC LASER AG, Niederoenz (CH)

(72) Inventors: Stefan Jost, Aeschi (CH); Alain Meyer, Kriegsstetten (CH); Stefan Jacobi, Westernkotten (CH)

(73) Assignee: BYSTRONIC LASER AG, Niederoenz (CH)

( * ) Notice: Subject to any disclaimer, the term of this patent is extended or adjusted under 35 U.S.C. 154(b) by 118 days.

(21) Appl. No.: 17/786,004

(22) PCT Filed: Dec. 14, 2020

(86) PCT No.: PCT/EP2020/085908
§ 371 (c)(1),
(2) Date: Jun. 16, 2022

(87) PCT Pub. No.: WO2021/122417
PCT Pub. Date: Jun. 24, 2021

(65) Prior Publication Data
US 2023/0013703 A1 Jan. 19, 2023

(30) Foreign Application Priority Data
Dec. 17, 2019 (EP) ..................................... 19216793

(51) Int. Cl.
*G06F 30/27* (2020.01)
*G06F 30/12* (2020.01)
(Continued)

(52) U.S. Cl.
CPC .............. *G06F 30/27* (2020.01); *G06F 30/12* (2020.01); *G06F 2111/20* (2020.01); *G06F 2119/18* (2020.01)

(58) Field of Classification Search
CPC ...... G06F 30/27; G06F 30/12; G06F 2111/20; G06F 2119/18
See application file for complete search history.

(56) References Cited

U.S. PATENT DOCUMENTS

| | | | |
|---|---|---|---|
| 10,414,046 B1 * | 9/2019 | Morey | ........................ B25J 9/08 |
| 2013/0054030 A1 * | 2/2013 | Murakami | ............. B25J 9/1697 |
| | | | 901/31 |

(Continued)

FOREIGN PATENT DOCUMENTS

| | | |
|---|---|---|
| DE | 102012219197 A1 | 4/2014 |
| DE | 102014204366 A1 | 9/2015 |

OTHER PUBLICATIONS

Mehta, Ankur M., et al. "Cogeneration of mechanical, electrical, and software designs for printable robots from structural specifications." 2014 IEEE/RSJ International Conference on Intelligent Robots and Systems. IEEE, 2014.*

(Continued)

*Primary Examiner* — Nithya J. Moll
(74) *Attorney, Agent, or Firm* — BelayIP

(57) ABSTRACT

A design unit and a computer-implemented method for calculating a design data set for designing a part-specific gripping tool for gripping parts that have to be transported from or to a processing machine is disclosed. The method includes the steps of providing part parameters for at least one part which is to be gripped with the part-specific gripping tool and executing a design algorithm which designs the part-specific gripping tool from the part parameters provided and thereby outputs a gripping tool data set as a result.

17 Claims, 6 Drawing Sheets

(51) Int. Cl.
  *G06F 111/20* (2020.01)
  *G06F 119/18* (2020.01)

(56) References Cited

U.S. PATENT DOCUMENTS

| | | | |
|---|---|---|---|
| 2014/0107843 A1* | 4/2014 | Okazaki | G05B 19/423 |
| | | | 700/260 |
| 2016/0082660 A1 | 3/2016 | Schuster et al. | |
| 2016/0288194 A1 | 10/2016 | Buchner et al. | |
| 2019/0224846 A1* | 7/2019 | Pivac | B25J 9/1679 |
| 2021/0138651 A1* | 5/2021 | Mcgregor | G05B 19/41885 |

OTHER PUBLICATIONS

Sdahl, Michael, and Bernd Kuhlenkoetter. "CAGD-computer aided gripper design for a flexible gripping system." International Journal of Advanced Robotic Systems 2.2 (2005): 15.*

Peidró, Adrian, et al. "An improved Monte Carlo method based on Gaussian growth to calculate the workspace of robots." Engineering Applications of Artificial Intelligence 64 (2017): 197-207.*

Proceedings of the 2009 International Forum on Computer Science-Technology and Applications (IFCSTA '09): "Intelligent Design Approach for Vacuum Suction Cup Units in Aircraft Flexible Assembly" (Qiu Yi et al.) published on Dec. 25, 2009 by IEEE in Piscataway, USA Seiten 146-149.

International Preliminary Examination Report for PCT/EP2020/085908, dated Nov. 23, 2021 (7 pages): labeled BYP20USOEE as filed herewith.

Submission along with Request for International Preliminary Examination under Art. 31 PCT. in Response to the Written Opinion of the ISA dated Feb. 17, 2021, dated Apr. 7, 2021, in International Phase of PCT/EP2020/085908.

English language translation of DE 102014204366 A1.
English language translation of DE 102012219137 A1.

* cited by examiner

GRIPPING TOOLS FOR A LASER CUTTING MACHINE FOR SORTING PARTS

CROSS REFERENCE TO RELATED APPLICATIONS

This application is a national phase application of International Application No. PCT/EP2020/085908, filed on Dec. 14, 2020, and claims the priority benefit of European Application 19216793.0, filed on Dec. 17, 2019, the content of both of which is incorporated herein by reference.

BACKGROUND OF THE INVENTION

Field of the Invention

The invention relates to the design of gripping tools for gripping cut or processed pieces or parts that have been cut or processed, for example, by a laser cutting machine. The gripping tool to be designed should be dimensioned specifically for the cut part or parts.

Description of Related Art

The parts processed by a laser processing machine are usually provided on a device, for example in the form of a table (for example a shuttle table) for sorting or removal by a robot.

For this purpose, two types of gripping tools are known in the prior art: On the one hand, specific gripping tools that are specifically designed for the respective transport task or for the part to be transported and, on the other hand, multifunctional gripping tools that can be used for different transport tasks or for different parts (e.g., different weight, shape and/or size of the parts).

The specific gripping tools are process-reliable, but have the disadvantage that a complex process for developing the gripper has to be carried out with known systems in the prior art.

The multifunctional gripping tools can be used in different applications but have the disadvantage that they do not function in a process-reliable manner with certain parts.

BRIEF SUMMARY OF THE INVENTION

This is where the present invention comes in. An object of the invention is to provide an approach with which gripping tools can be used in a process-reliable manner for different applications (e.g. for different transport tasks and/or pieces or parts).

According to a first aspect of the invention, this object is achieved by a computer-implemented method for calculating a design data set for designing a part-specific and in particular modular gripping tool (made up of modular components) for fully automatic, in particular robot-based gripping of parts, i.e. components that have to be transported by a robot. The parts can be, for example, processed pieces or pieces to be processed of a processing system, for example of a laser processing system (for example of a laser cutting system) or bent pieces of a bending machine. The method comprises the following method steps:

providing part parameters for at least one part which is to be gripped with the gripping tool. The gripping can take place for sorting or separating, for transporting, for adding and/or removing and/or for separating or can be executed within the scope of the aforementioned processes.

executing or using a design algorithm which designs the part-specific gripping tool from the part parameters provided and thereby provides a gripping tool data set as a result.

The solution presented here has the advantage that the gripping tools can be provided more quickly and with greater process reliability or with an improved accuracy of fit for the respective gripping task. The robot (gripping robot) can thus be loaded and operated more quickly. The overall process time can thus be reduced. Thanks to the knowledge-based design, the gripping tools can also be better (more appropriately) designed and errors caused by manual incorrect designs can be avoided. The design algorithm calculates an optimal gripper geometry for the respective gripping task (part, movement) and can, among other things, automatically create a design drawing of the gripper (e.g. CAD) as a result, if it is not available or cannot be assembled locally on the machine. In this case, a parts list of the required components (e.g. suckers, magnets, connections, etc.) can also be created automatically.

In a preferred embodiment of the invention, the part parameters can include all parameters that are relevant for the design of a gripping tool in order to grip the part. The part parameters can be selected from a group comprising: a weight, a centre of gravity of the part, cut-outs or projections in the part, bending-relevant parameters and design and material-based parameters of the part. The part parameters can advantageously be configured in a configuration phase of the method in order to plan the method specifically for the respective application. This means that you can configure which part parameters are to be taken into account in the design calculation. In an advantageous development of the invention, the part parameters can be calculated from a recorded cutting plan. Only the cutting plan is then provided and the parameters are then calculated from the provided cutting plan and imported for the design algorithm. This allows the computer-implemented method to be planned and adapted even more precisely.

In a further, preferred embodiment of the invention, the gripping tool can have a modular structure made of a quantity of gripping tool components. Availability data that represents which gripping tools and/or which gripping tool components (e.g. suckers, magnets, arms, etc.) are locally and currently available can be held in a database. For this purpose, an availability file can be kept and continuously updated, so that a gripping tool in the form of a modular construction kit is "selectable" or combinable from a plurality of components. The database and/or the availability file is accessed with the provided gripping tool data set. Assembly instructions can be automatically provided with a selection command for selecting the components for the purpose of assembly into a gripping tool.

"Available gripping tool" means either a completely designed gripping tool or a gripping tool that can be designed from the available components (e.g. suckers, base plates, magnets, hoses, connection elements). If the gripping tool or its components is/are locally available, a corresponding availability message, for example in the form of a report, can be output on a user interface.

If the gripping tool is not available locally or if not all necessary components are available locally on the machine, the gripping tool data set is used to create a design data set, which is used for designing the gripping tool. The design data set can contain a parts list, for example. The design data set can also contain assembly instructions.

In this advantageous embodiment of the invention, a design data set can thus be created from the gripping tool data set, for example in the form of a STEP file—STEP stands for STEP (STandard for the Exchange of Product model data) and is a standard for describing product data. In addition to the physical aspects, it also includes functional aspects of the gripping tool. STEP is formally defined in ISO 10303. The design data set is preferably only generated if the designed gripping tool is not locally available. "Locally available" in this context means the availability on or at the processing machine. For this purpose, a storage module can be provided in which a quantity of gripping tools with their components are stored. This has the advantage that the design data set is only created when it is required and therefore no tool can be used for the upcoming transport task.

The term "gripping tool data set" in this application relates to an electronic data set which is used to specify and/or identify a gripping tool and/or to determine and/or select it from a quantity of different gripping tools. The gripping tool data set contains at least the following three parameters:

1. gripper type (pneumatic, magnetic, etc.)
2. gripper size and
3. number of grippers.

Further specifications can be made in other embodiments of the invention.

The design data set, which is preferably only created if the gripping tool is not already locally available, can include a parts list. The design data set preferably contains design data for generating a gripper holder on which different and at least the required grippers can be mounted.

For example, all gripping tools available in the local warehouse or storage module of the laser processing machine are represented in an availability file. If the gripping tool data set now specifies that a quantity of gripping tools A, B and C (with fully assembled components A1, A2, B1, B3, B5 and C) is required for the respective transport or gripping task, then a simple access to the availability file or a simple read function can be used to check whether all gripping tools are available locally and whether the gripper can be loaded and operated. In this case, no further calculation of the design data set is required to save computing load. Otherwise, the gripping task cannot be carried out with the locally available tools and the design data set has to be calculated.

In a preferred embodiment of the invention, the design algorithm can access a database with saved part and gripping tool data. In the database, for example, assignments of gripping tools with their components can be stored, each of which is required for a gripping task.

The design algorithm can be designed in two parts. It comprises a gripper determination function for determining the type, size and number of the minimum required grippers and a position calculation function for determining the position of each gripper. The two functions can be carried out at different time phases and preferably sequentially. The gripper determination function is preferably carried out before the position calculation function and imports the part parameters as input variables. The position calculation function can import the result of the gripper determination function and can also import acceleration values for moving the part or other movement parameters that characterise the transport task of the part and/or import data from a physical model of the part, e.g. to be able to determine the centre of gravity of the part based on the part parameters.

Basically, the design algorithm is used to calculate the optimal size of the gripper, e.g. the suction cup, depending on the shape, material, material thickness and/or cycle time and also calculates how many of them are minimally required in order to be able to guarantee clean removal. This information (which suction cup and how many of them) as a function of the acceleration values is used as input for calculating the optimal positioning of the gripper head (position calculation function). For example, if only one suction cup is needed, the position is positioned as close as possible to the gravitational axis (calculation of the centre of gravity with a physical model) to guarantee that the part is lifted correctly. If two or more suction cups are required, then they are placed as far apart from each other as possible.

In order to carry out the position calculation function, the position specification for a respective component of the gripping tool can be configured. The position calculation function can execute a brute force algorithm, a randomised algorithm and/or a mixed form. These approaches are explained in more detail in the detailed description of the figures.

In another preferred embodiment of the invention, the gripping tool can be operated by a robot as part of a pick-and-place application.

In another preferred embodiment of the invention, the design data set can include a parts list for the designed gripping tool (for example as a STEP file). The design data set can also include a position specification for a component (e.g. sucker) of the gripping tool.

In a further development, this position specification can be configurable. For example, in a configuration phase, it can be set that the suckers should basically engage at the centre of gravity of the part. This offers the advantage that the user can bring his specific empirical values into the calculation (e.g. "component X has always tipped with gripper A and could not be reliably gripped→better to use gripper A").

In a further advantageous embodiment of the invention, the design algorithm can import an electronic cutting plan of a cutting machine (e.g. a laser cutting machine) and/or a bending plan of a bending machine cumulatively or as an alternative to the part parameters. For example, the shape and size and other parameters relevant to gripping can be calculated from the cutting plan. It is also possible that only the cutting plan is imported, from which the part parameters are then calculated.

In a further advantageous embodiment of the invention, an error message (or report) can be generated and output if the design algorithm cannot calculate a result for the pending gripping task or if the gripping tool cannot be designed for the part to be gripped.

In a further advantageous embodiment of the invention, an interface to a storage unit for gripping tools and their components of an automation system and/or a laser system and/or an ordering application can be formed. Suitable instructions are provided to instruct the respective units. For example, in response to an instruction signal, an automatic ordering process can be triggered for the gripping tool designed according to the design data set. Likewise, on the basis of assembly instructions provided by the design unit, the storage unit can be instructed to select the required components and to load a carrier or a gripper holder therewith, taking into account the positions for the grippers calculated by the position calculation function.

In a further aspect, the present invention relates to a design unit for calculating a design data set for designing a gripping tool for a processing system having:

an import interface for importing part parameters for at least one part to be accessed on, at or by a processing machine;

a processing unit which, in response to the imported part parameters, is intended to execute the design algorithm to design the part-specific gripping tool using the imported part parameters and to provide and/or output a gripping tool data set as a result.

In a further aspect, the present invention relates to a processing machine, for example a cutting or bending machine with a design unit, as described above.

The processing machine is preferably a metal processing machine, in particular a laser system, such as a laser cutting machine or a bending machine. The pieces processed by the processing machine—called parts here—must be transported. To do this, they must be specifically gripped depending on the size, shape, weight, material and/or other parameters of the part.

The laser cutting system can sequentially execute different or corresponding cutting plans for different pieces of sheet metal. The cutting result with the cut parts must always be transported and, in particular, disposed of. With the design algorithm proposed here, it is advantageously possible to design and conceive the gripping tool in such a way that it is suitable for several cutting plans and thus for several sequences of cut parts. If, for example, a first sheet is cut with a first cutting plan and then a second sheet with a second cutting plan (thus with other cut parts), the gripping tool can advantageously be designed for several cutting plans of the cutting machine, which are executed one after the other on the machine. This means that set-up times for loading the gripping tool can be avoided and the overall process time can be reduced.

The parts are pieces or components that are processed by the processing machine or are already in a processed form, e.g. as cut-out parts that are cut out from a workpiece or scrap skeleton with a laser cutting machine and must be removed from the scrap skeleton. The parts can have a substantially two-dimensional shape (cut sheet metal parts) or a three-dimensional shape (bent parts). The parts can be symmetrical or asymmetrical in shape. It is obvious that small, flat pieces or parts can be gripped with a different gripping tool than large, thick metal parts, which may also require a plurality of gripping tools for the gripping task. In a preferred embodiment of the invention, the parts are made of metal and are defined by the cutting plan. The parts can have different shapes, sizes and/or weights. The material and/or the density of the part can also be different.

The gripping tool is used to grasp one or more parts to transport the part, for example for sorting parts from the shuttle or cutting table or for transporting the scrap skeleton from the shuttle table, for other transport, for separating, removing, adding, stacking, bending. The gripping task can be executed by means of a robot, for example in the context of a Cartesian system of a pick-and-place application. The gripping tool can be designed to grip exactly one part, for example by means of a pneumatic or magnetic sucker. The gripping tool can, however, also be designed to grip several parts at the same time, for example to remove adjacent parts by means of a single gripping tool. In the case of complex parts, it may also be necessary to provide several gripping tools for a part in order to transport the part. This can be important, for example, if the part is very heavy and/or large and/or if the gripping or transport task has special requirements or prerequisites, such as that the part may only be moved in an absolutely horizontal state.

The gripping tool can have a modular structure. The gripping tool can comprise at least one pneumatic, mechanical, magnetic and/or adhesive gripping component. The gripping tool can comprise a connection element for connecting (mechanically and electronically) with an actuator/drive element, for example in the form of a robot arm. Further mechanical components can be arranged on the connection element (for example brackets), which can serve to receive a base plate or a holder. At least one gripping component is attached—preferably detachably—to the base plate. Depending on the embodiment of the invention and the configuration, several different or identical gripping components can also be attached to the base plate. Depending on the gripping task and part, the gripping components are calculated and the gripping tool can be loaded with the calculated gripping components.

The term "part parameters" relates to a quantity of parameters that characterise the part to be gripped with regard to its physical, mechanical and/or other technical properties, such as size, shape, weight, material etc. In a preferred further development of the invention, at least one part parameter can be calculated from other part parameters and/the other characterising values.

The design algorithm is a calculation specification that designs the part-specific gripping tool from the imported part parameters and outputs a gripping tool data set as the result.

Further advantages, features and details of the present disclosure result from the following description of preferred embodiments and drawings. The characteristics and combinations of features mentioned above in the description, as well as the characteristics and combinations of features listed below in the description of figures and/or shown in the figures alone, are not limited to the combination indicated in each case; but can also be used in other combinations or on their own without leaving the scope of the invention.

In the following detailed description of the figures, non-limiting exemplary embodiments with the features and further advantages thereof will be discussed with reference to the drawings.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The following is an advantageous embodiment of the invention with reference to the accompanying figures, wherein.

DETAILED DESCRIPTION OF THE INVENTION

Figure 1:
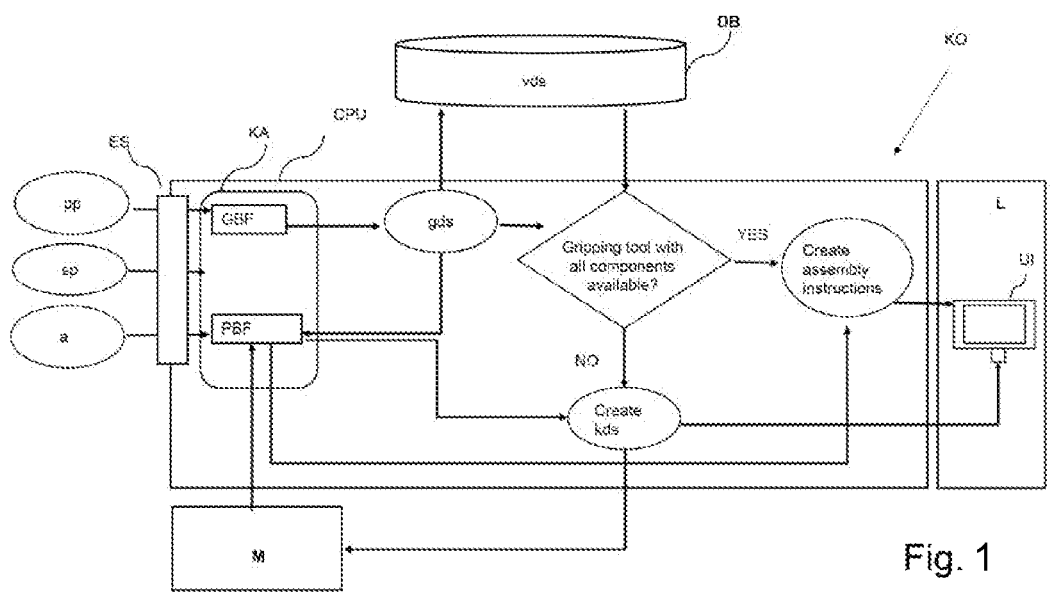
FIG. 1 depicts a schematic view of a computer unit which is designed as a design unit KO and is determined on the basis of the parts parameters for calculating a design data set.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including not only one of A, only one of B, only one of C, or any combination of A, B, and C.

An application for the present invention may be a shuttle table for a laser processing machine, in particular a laser cutting system, on which cut parts are positioned, which must be gripped and transported from there by means of a robot-based gripping device, in particular the parts must be removed from the scrap skeleton and, for example, stacked on pallets. Depending on the cutting plan, different types (shapes, sizes) of parts can be transported and thus also gripped.

Depending on the size, shape and other parameters of the part, different gripping tools are necessary in order to be able to fulfil the gripping task. For example, large and heavy parts require more or more powerful gripping tools, in particular with correspondingly more or more powerful gripper components (for example mechanical, magnetic or pneumatic suckers) than small, light parts. According to the invention, the design of the gripping tool is advantageously part-specific. A first quantity of parts is thus gripped by a first gripping tool, while a second quantity of parts is gripped by a second gripping tool, etc. The quantity is characterised by the respective part parameter. The part parameters can be partially or completely calculated from the cutting plan of the laser processing machine.

The gripping tool can be attached to a robot arm via a connection element, such as a so-called gripper holder or a gripper plate. The robot arm with the gripping tool, which is movable in the three spatial axes, forms a gripping device.

In a preferred embodiment of the invention, the gripper plate 30 (FIG. 3A) or the gripper holder (rail) 40 (FIG. 3B), 10 (FIG. 7) is automatically designed if no standard parts (e.g. sucker 80) are available or can be used for the pending gripping task. The gripper plate 30, 40 is designed so that the necessary components K can be attached to the position calculated (by the position calculation function PBF).

Basically, the end customers of laser cutting systems manufacture sheet metal parts in a broad and unpredictable array of variations. The cut parts P are then removed from a sorting device by means of (for example vacuum and/or magnetic) gripping tools and placed on a pallet. For this purpose, a limited number of prepared gripping devices can be offered in the known systems. The problem with the systems known in the prior art is that these gripping devices cannot fit all possible parts (for example because a suction cup could be positioned over a hole or the gripper does not cover the part geometry). Another problem is that the necessary design knowledge is often not available for the design of new, suitable gripping devices. This is where the invention comes in and provides a method (as a use or application) and a design unit KO which automatically designs a suitable gripper and outputs it as a 3D file with a parts list at the end. An electronic description (e.g. STEP file) of a sheet metal part is loaded into the application. The application checks whether existing grippers are available or can be provided on site. If no existing gripper fits, a suitable gripping tool G is automatically designed. The method makes use of a database of components, in particular based on the modular principle, in order to automatically design the gripper. For example, various (suckers, magnets, hoses, base plates, etc.) are stored. In the design algorithm, factors such as the dimensions of the piece, weight, centre of gravity, cut-outs and/or bending problems are calculated and taken into account. After the gripper has been designed, a finished assembly is output as an electronic description (e.g. STEP file) including a parts list.

Advantageously, several parts P of a cutting plan sp or even several cutting plans are taken into account in the design of the gripping tool. The method can thus be carried out very efficiently in that—if possible—sometimes only one gripping tool has to be calculated and provided for a quantity of different cutting plans. It is therefore not necessary to change the gripping robot and the gripping task can also be carried out for different parts P and/or for different cutting plans by the same gripping tool.

For this purpose, the invention executes a design algorithm KA on a computer unit CPU (e.g. a computer, a computer network, processor, microprocessor or an embedded device).

FIG. 1 shows, in the manner of a block diagram, a design unit KO which is intended as an electronic unit for carrying out the method. The design unit KO comprises an import interface ES for importing part parameters pp for at least one part P to be gripped which is processed by the processing machine L and a processing unit CPU which, in response to the imported part parameters pp, is intended to execute the design algorithm KA that can design the part-specific gripping tool W from the imported part parameters pp and provide a gripping tool data set gds as a result—in particular on a user interface UI—or execute further calculation steps. If no gripping tool can be designed for the required gripping task, an error message can be output on the user interface UI. As shown schematically in FIG. 1, the calculated gripping tool data set gds can be further processed in the design unit KO. For this purpose, availability data or an availability data set vds can also be imported from a database DB, which represents the local availability of gripping tools W and their components K on or at or for the laser L. The two data sets: the gripping tool data set gds and the availability data set vds are calculated using a further algorithm to produce a result in the form of a design data set kds. The design data set kds specifies the specifications according to which the gripping tool W must be designed. For this purpose, the design data set kds contains design instructions and a selection of required gripping components K as well as positioning information for the required gripping components K. This has the advantage that the design data set kds only needs to be calculated if the required specification of the gripping tool W is not available. Computing resources can thus be saved.

As shown schematically in FIG. 1, a cutting plan sp can also be imported. The part parameters pp can be calculated from the cutting plan sp by means of a further algorithm. It is possible to import both the part parameters pp and the cutting plan sp in order, for example, to verify the correctness of the imported part parameters pp using the data from the cutting plan sp. Alternatively, only the cutting plan sp or only the part parameters pp can be imported. The imported data (part parameters pp and/or cutting plan sp) can also be imported as a STEP file.

The database DB can, as in the example shown in FIG. 1, be connected to the design unit KO as an external, separate entity via appropriate data connections (LAN; WLAN) and, for example, be provided centrally. The database DB can, however, also be designed internally and locally on the design unit KO. The same applies to the user interface UI. It can be formed locally on the design unit KO or on another electronic entity, for example on a mobile unit with corresponding data connections (smartphone, etc.).

As shown in FIG. 1, the design unit KO can interact with a model M. The model M contains electronic data sets which characterise the mechanical properties of the respective part P, such as the centre of gravity, weight, length, width and/or other part-specific parameters that specify a certain gripping tool for a certain gripping task. The model M can be designed to be self-learning and can be fed with the calculated gripping tool data set gds and/or design data set kds as feedback variables. Furthermore, other feedback variables can be taken into account, such as an evaluation by the user about the quality of the automatic design.

Figure 2:
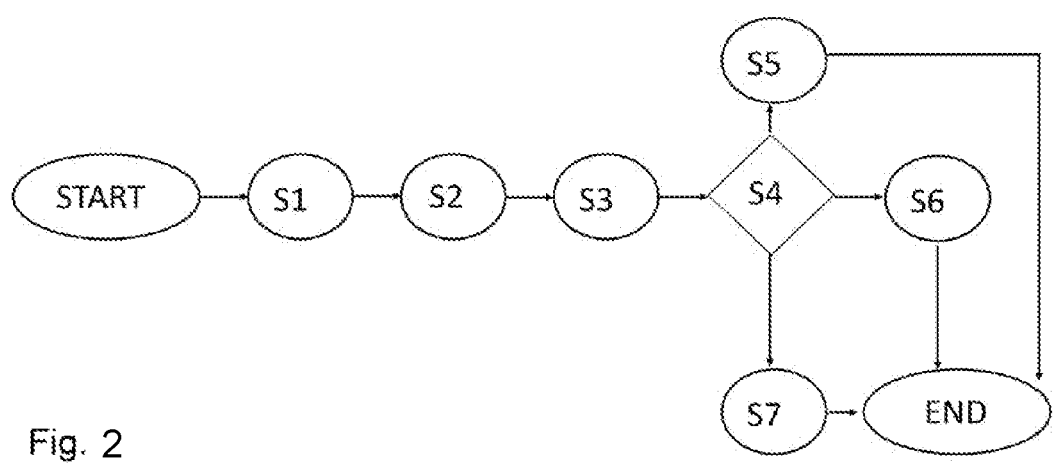
FIG. 2 depicts a flowchart of a method according to a preferred embodiment of the invention.

FIG. 2 shows the sequence of the method according to a preferred embodiment of the invention. After the start of the method, the part parameters are imported via the import interface ES in step S1. Additionally or alternatively, the cutting plan sp can be imported in step S2. It is also possible that the cutting plan or at least parts thereof are contained in the part parameters and thus only the cutting plan sp, possibly with selected part parameters pp, is imported in step S1. In step S3, the design algorithm KA is executed with the imported data and the gripping tool data set gds is provided. In the simplest case, the gripping tool data set gds can consist of a quantity of standard parts that are in stock for the robot arm. The robot then only has to select the standard parts from a store and position them in the correct position, which is done on the basis of the calculated position. In step S4, the local availability of the designed gripping tool W with its components K is checked. If this is available for the respective gripping task for the part P gripping tool W to be gripped, no design data set kds has to be created. It is only necessary that a command be generated in step S5 with which, for example, the robot or another actuator selects and removes the gripping tool W or its parts or components K from the store. Otherwise, if the necessary components K are not in stock and the gripping tool W has to be specially designed, the design data set kds is calculated in step S6 and can be output on the user interface UI and/or passed on to other electronic entities as a file, in particular a STEP file. It is also possible that no gripping tool for the respective part P can be designed for the gripping task (e.g. too heavy, too big, etc.). In this case, the error message is output in step S7 (for example on the UI) and/or made available to other entities.

Figure 3A:
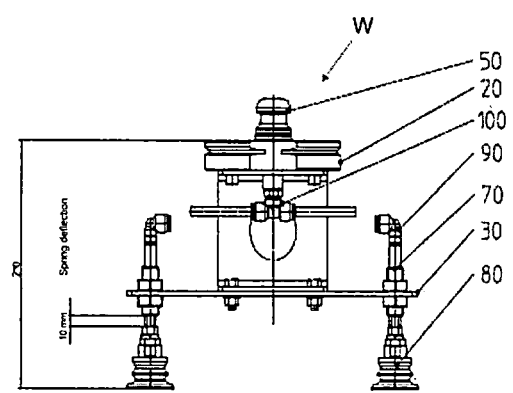
FIGS. 3A and 3B each depict a side view of a gripping device with a one- and two-element gripping tool according to a preferred embodiment of the invention.
Figure 3B:
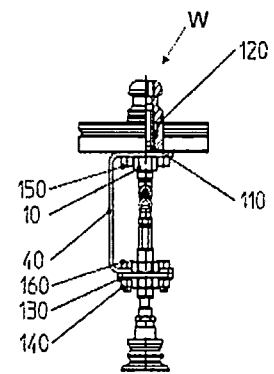

FIGS. 3A and 3B show the structure of a gripping device. This includes a robot-based actuator (e.g. robot arm, not shown), which is connected to the gripping device via a coupling 50. The gripping device contains the gripping tool W, which is designed here as a sucker 80. The gripping device also contains a flange 20, a pneumatic distributor 100, a pneumatic connection 90 and a spring plunger 70. The gripping device comprises a gripper plate or a differently shaped gripper holder (for example a U-shaped rail) on which—in this example two—suckers 80 are positioned and fastened. FIG. 3A shows a gripping device with a U-shaped mounting bracket 40, which in this case is designed as a gripper holder and serves to receive and attach a sucker. The mounting bracket 40 can be connected to the coupling 50 via a washer 110 and a ring 120. In this example, the gripping device comprises a stopper 10, screws 160 and, on the lower part of the mounting bracket 40, further washers 130 and nuts 140 for fastening the part-specific sucker. Further connection modules can be used to hold the modular gripping components K, for example the sucker 80. The gripping components K can basically comprise different types of suckers 80 (pneumatic, magnetic, adhesive, etc.) and/or other (for example mechanical) gripping components K. The components K are selected specifically for the respective gripping task in relation to the part P to be gripped.

In summary, a method (and a corresponding device) is provided that uses an input design (e.g. STEP of a part or sheet metal part) to determine whether and which of the existing gripping components (e.g. gripping heads) would fit on the part. If no existing components fit, the software automatically designs a suitable gripper head using the supplied database of pieces. This means that the method outputs a finished assembly (e.g. as a STEP file including parts list) as the result. When calculating using the design algorithm, factors such as the dimension of the piece, weight and/or bending-specific parameters and problems are taken into account. The procedure also communicates the reasons why an automatic design is not possible in certain cases.

The design algorithm KA comprises at least two functions:
1. a gripper determination function GBF and
2. a position calculation function PBF.

Figure 4:
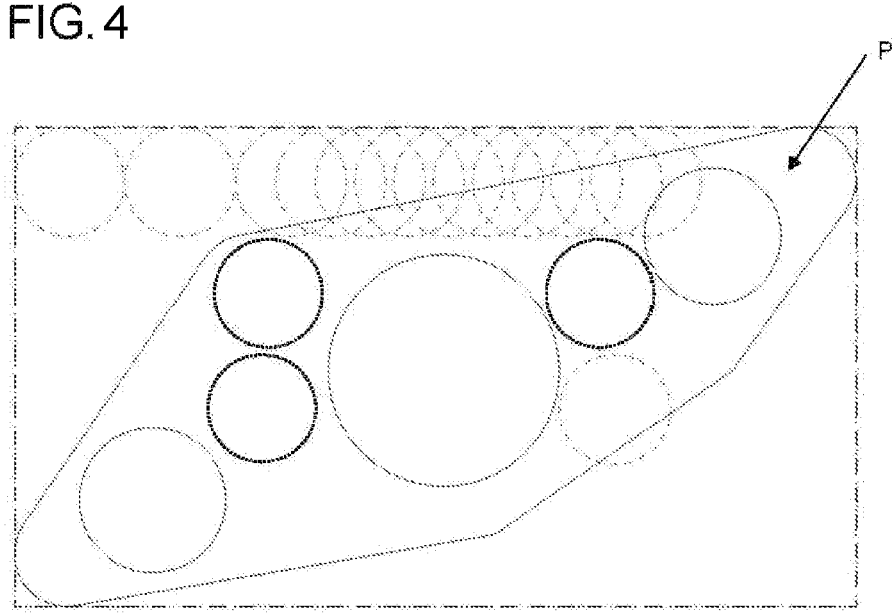
FIG. 4 depicts an example of a sheet metal part with cut-outs for calculating the positioning of the gripper(s)

The position calculation function PBF can be implemented using a brute force algorithm. The brute force algorithm is based on the following aspects, which are explained in connection with the schematic drawing of FIG. 4:

1. In order to calculate the optimal position of the gripper head on the sheet metal part, the possible positions that the vacuum gripper could have are successively checked. FIG. 4 shows the simulation of the search for the positions of a vacuum gripper.
2. The distance between the circles when searching for possible positions can be parametrised. For example, in FIG. 4, the two circles at the top left are more spaced apart than the circles that follow on the right. The greater the distance between the circles, the faster the search will be, but the lower the chance of finding a good solution.
3. If no or no good solution is found (for example, the top row of the circles is represented by a dashed line in FIG. 4), the process can be repeated with a smaller distance in order to find more possible positions.
4. After the possible positions have been obtained (see the dotted circles in FIG. 4, in this example 3/three positions), a head base is sought that matches the positions of the vacuum grippers that have been found.
5. If there is no existing gripper head, the optimal solution is chosen by the system to generate a new gripper head.

Figure 5:
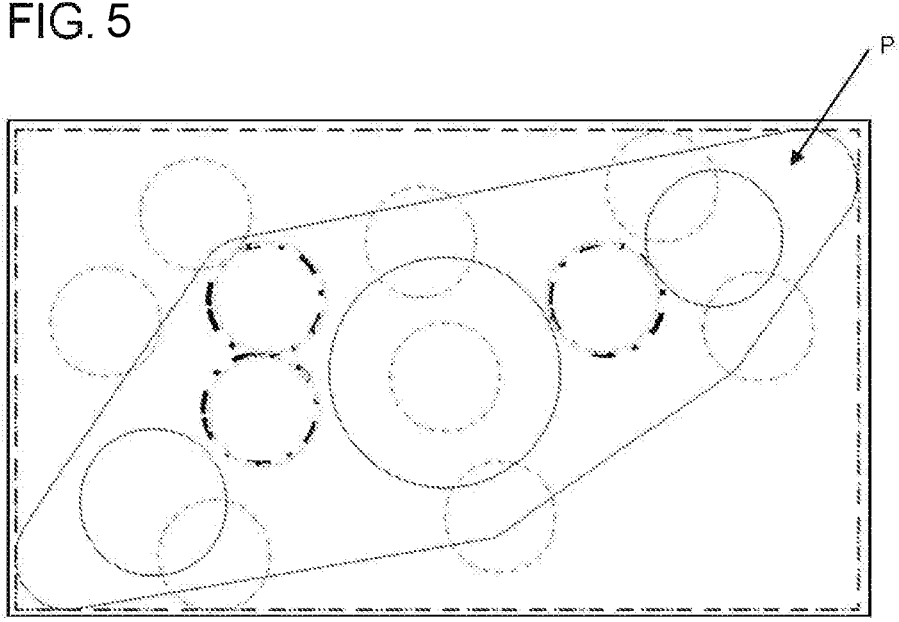
FIG. 5 depicts a further example of a sheet metal part with cut-outs for calculating the positioning of the gripper(s)

A further, second possibility to implement the position calculation function consists of the randomised algorithm, which is explained below with reference to FIG. 5:

In this second proposal (see FIG. 5), the suction cup positions are generated according to the random principle (all circles). As in the Monte Carlo simulation, a large number of random values are generated which are then compared to see whether or not they are possible candidates.

1. A large number of random values are generated for the possible sucker positions. In FIG. 5, the dashed thin circles represent positions which do not meet the requirements; and the dash-dotted circles in bold are positions that meet the requirements (in this example 3/three positions).
2. After the possible positions have been obtained (see the bold, dash-dotted circles in FIG. 5), a gripper head is sought that matches one of the vacuum positions found.
3. If there is no possible solution, the optimal solution is chosen, which is a new gripper head.

Figure 6:
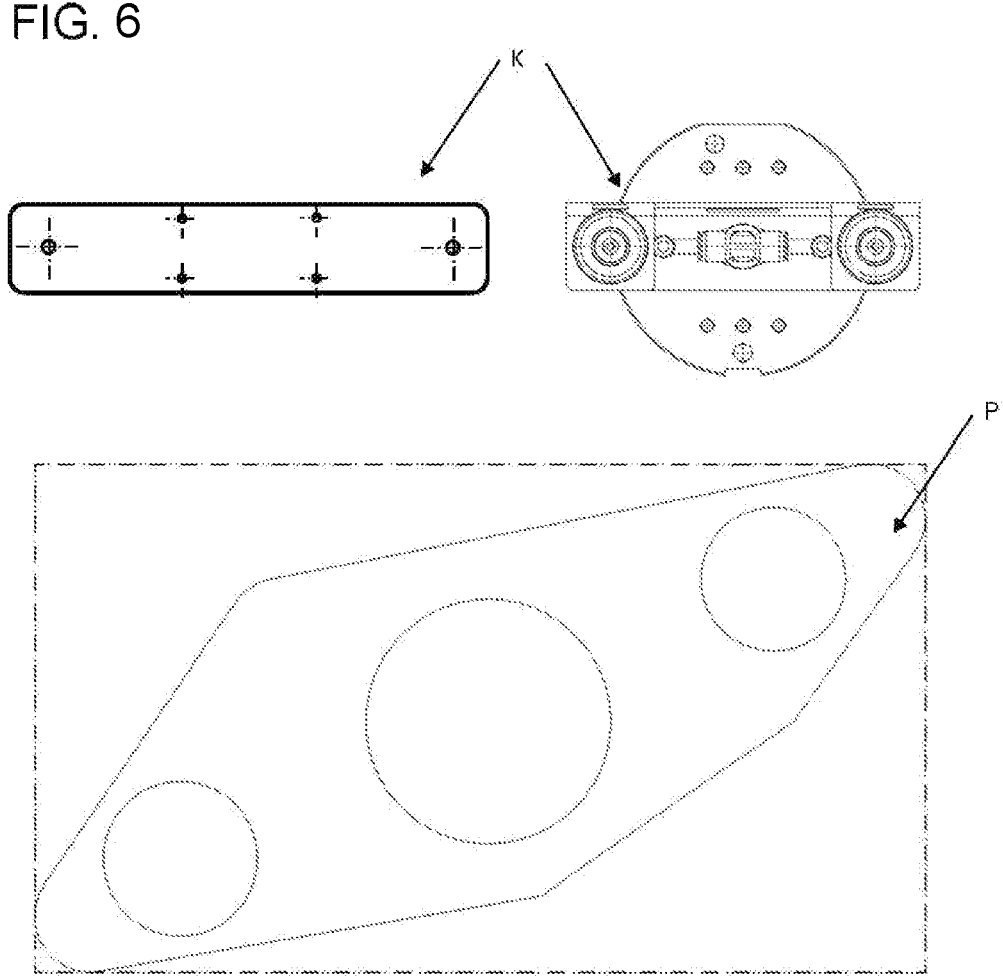
FIG. 6 depicts a further example of a sheet metal part with cut-outs for calculating the positioning of the gripper(s)

A further, third possibility to implement the position calculation function consists of the mixing algorithm, which is explained below with reference to FIG. 6:

One of the major disadvantages of the algorithms mentioned above is that the system has to determine a very large number of possible positions in order to obtain an (almost) optimal solution. The system therefore has a certain percentage inaccuracy. The third version is a mixture of the two previous versions that tries to take advantage of both versions.

The process starts with the second proposed version (calculate positions—random principle). First, the possible positions of the vacuum grippers are searched for at random (as explained above). From the possible positions found, the brute force algorithm calculates the possible positions in the vicinity of the point found in order to find the best possible positions for lifting the sheet metal part. Not only does this increase the likelihood of finding a better position, but it also makes the process a lot faster.

In addition, there are other implementation options for the position calculation function in the application of methods of artificial intelligence, deep learning, etc. Furthermore, physical models can be used to calculate the deflection of the parts or standard formulas to position the suckers so that no or little deflection arises when removing.

Figure 7:
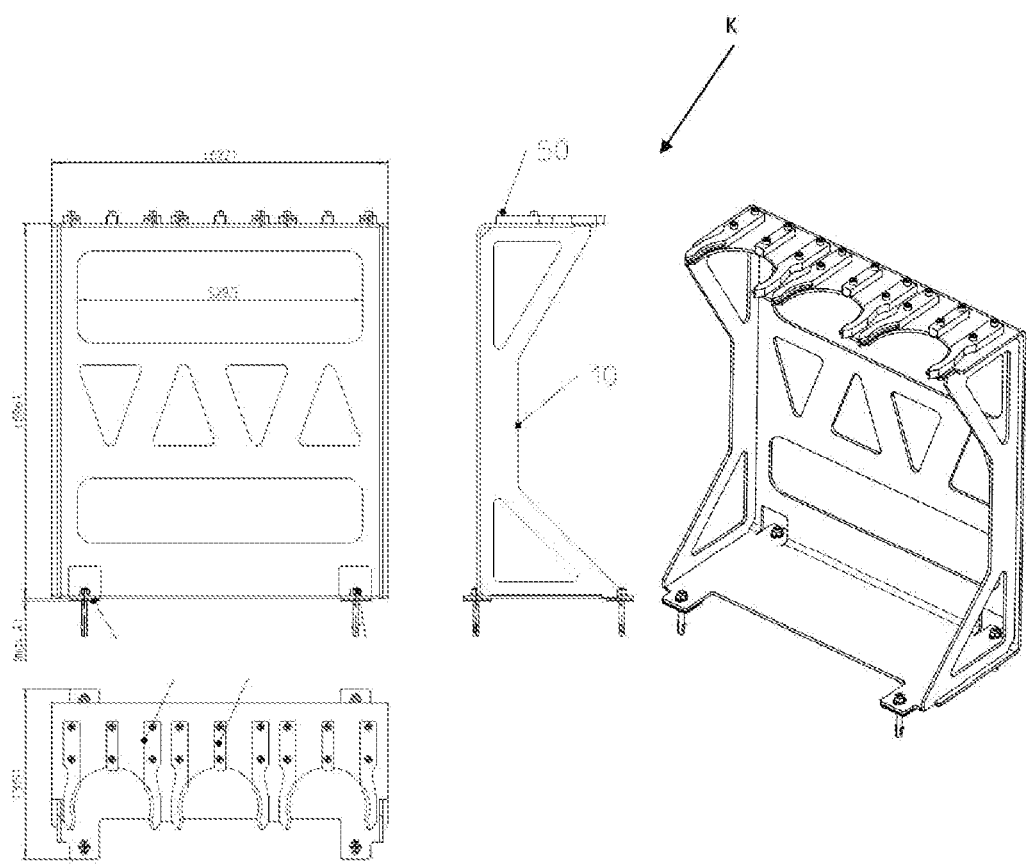
FIG. 7 depicts an alternative form of the gripper holder in the form of a U-rail according to a preferred embodiment of the invention.

FIG. 7 shows a further example of a gripper holder in the form of an interchangeable frame, which is identified here with the reference numeral 10. Bores 50 can be formed in the interchangeable frame in order to receive further connection elements, as explained above in connection with FIGS. 3A and 3B.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser cutting systems, but also for other machines and systems in production that require parts or components to be gripped. Furthermore, the components of the device of design unit can be produced so as to be distributed over several physical products.

The invention claimed is:

1. A computer-implemented method for generating a design data set for designing a part-specific gripping tool for gripping parts that have to be transported from or to a processing machine, the method comprising the steps:

providing part parameters for at least one part to be gripped with the part-specific gripping tool;
executing a design algorithm configured to design the part-specific gripping tool from the part parameters;
generating a gripping tool data set based upon the step of executing;
accessing a database in response to the generated gripping tool data set, the database comprising availability data identifying which of at least one gripping tools and gripping tool components are locally and currently available to the processing machine;
determining whether the gripping tool is locally and currently available; and
if the gripping tool is determined to be locally and currently available, selecting the gripping tool with at least one of a robot or another actuator and generating instructions enabling assembly of the part-specific gripping tool; and
if the gripping tool is determined not to be locally and currently available, generating a design data set for the part-specific gripping tool from the gripping tool data set.

2. The computer-implemented method according to claim 1, wherein the part parameters comprise at least one of a weight of the part, a center of gravity of the part, cut-outs in the part, projections in the part, bending-relevant parameters of the part, other design parameters of the part, and material-based parameters of the part.

3. The computer-implemented method according to claim 1, wherein the design algorithm comprises:
a gripper determination function configured to determine at least one of a type, a size, and a number of minimal required grippers; and
a position calculation function configured to determine a position of each gripper.

4. The computer-implemented method according to claim 3, further comprising the step of configuring a position specification for a component of the gripping tool in the position calculation function.

5. The computer-implemented method according to claim 3, further comprising the steps of at least one of:
processing at least one acceleration value as an input variable in the position calculation function; and
wherein the position calculation function is configured to execute at least one of a brute force algorithm, a randomised algorithm, and a mixed form of the brute force algorithm and randomized algorithm.

6. The computer-implemented method according to claim 1, wherein the design data set comprises a designed gripping tool parts list of at least one of gripping tool components, connecting parts, and a gripper holder.

7. The computer-implemented method according to claim 1, wherein at least one of:
the part-specific gripping tool comprises a modular structure made from a quantity of gripping tool components; and
the part-specific gripping tool is configured to be operated by a robot as part of a pick-and-place application.

8. The computer-implemented method according to claim 1, wherein the step of executing further comprising the steps of providing in addition to the part parameters, an electronic cutting plan of at least one of the processing machine and a cutting machine.

9. The computer-implemented method according to claim 1, further comprising the steps of:
determining feasibility of designing a gripping tool configured to grip the part, and generating and outputting an error message if it is not feasible.

10. The computer-implemented method according to claim 1, further comprising the steps of:
forming an interface to an ordering application the interface configured to trigger an automatic ordering process in response to an instruction signal, the ordering process being for the gripping tool designed according to the design data set.

11. The computer-implemented method according to claim 1, further comprising the steps of:
loading a computer program product into an internal memory of a digital computer, the computer program comprising computer program sections configured to execute the method according to the preceding method claim 1 when the computer program sections are executed on the digital computer.

12. A design unit for generating a design data set enabling designing a part-specific gripping tool for gripping parts that have to be transported from or to a processing machine the design unit comprising:
an import interface configured to provide part parameters for at least one part to be gripped and processed by the processing machine;
a processing unit configured, in response to the provided part parameters, to execute a design algorithm that designs the part-specific gripping tool using the imported part parameters, and to provide a gripping tool data set as a result of the executed design algorithm, and
a least one data connection configured to access a database in response to the provided gripping tool data set, a database comprising availability data stored therein, the data being indicative of at least one locally and currently available gripping tools and gripping tool components for the processing machine,
a CPU configured to:
access the database via the at least one data connection,
determine whether the part-specific gripping tool designed for the part to be gripped is locally and currently available with the gripping tool components and
if the part-specific gripping tool is determined to be locally and currently available, select the gripping tool with at least one of a robot or another actuator and generate assembly instructions enabling assembly of the part-specific gripping; and
if the part-specific gripping tool is determined not to be locally and currently available, generate a design data set for the part-specific gripping tool from the gripping tool data set.

13. The design unit according to claim 12, wherein the part parameters comprise at least one of a weight of the part, a center of gravity of the part, cut-outs in the part, projections in the part, bending-relevant parameters of the part, other design parameters of the part, and material-based parameters of the part.

14. The design unit according to claim 12, wherein the design algorithm comprises:
a gripper determination function configured to determine at least one of a type, a size, and a number of minimal required grippers; and
a position calculation function configured to determine a position of each gripper.

15. The design unit according to claim 14, wherein the position calculation function is further configured to determine a position specification for a component of the gripping tool.

16. The design unit according to claim 14, wherein:
the design algorithm is further configured to process at least one acceleration value as an input variable in the position calculation function; and
the position calculation function is configured to execute at least one of a brute force algorithm, a randomized algorithm, and a mixed form of the brute force algorithm and randomized algorithm.

17. The design unit according to claim 12, wherein the design data set comprises a designed gripping tool parts list of at least one of gripping tool components, connecting parts, and a gripper holder.

* * * * *